United States Patent [19]

Leonard et al.

[11] 3,896,077
[45] July 22, 1975

[54] UNDERWATER ADHESIVE

[76] Inventors: Fred Leonard, 7713 Beech Tree Rd., Bethesda, Md. 20034; George Brandes, 30 Sidonia Ave., Coral Gables, Fla. 33134

[22] Filed: Nov. 30, 1970

[21] Appl. No.: 93,903

Related U.S. Application Data

[63] Continuation of Ser. No. 857,538, Sept. 12, 1969, Pat. No. 3,607,542, which is a continuation-in-part of Ser. No. 699,062, Jan. 19, 1968, abandoned, which is a continuation-in-part of Ser. No. 586,316, Oct. 10, 1966, abandoned.

[52] U.S. Cl. ............ 260/42.48; 156/285; 156/327; 156/331; 260/42.27; 260/78.4 N
[51] Int. Cl. ............................................ C08f 45/04
[58] Field of Search. 260/41 A, 41 B, 41 C, 88.7 A, 260/78.4 N, 42.27, 42.48

[56] References Cited
UNITED STATES PATENTS

| | | | |
|---|---|---|---|
| 2,784,127 | 4/1957 | Joyner | 154/43 |
| 2,794,788 | 6/1957 | Coover et al. | 260/17 |
| 2,833,753 | 5/1958 | Lal | 260/89.5 |
| 3,350,372 | 10/1957 | Anspon et al. | 260/86.7 |
| 3,442,851 | 5/1969 | McManimie | 260/41 |
| 3,485,790 | 12/1969 | Potter | 260/41 |

*Primary Examiner*—James H. Derrington
*Attorney, Agent, or Firm*—Irwin M. Aisenberg

[57] ABSTRACT

Pastes of α-cyanoacrylic acid esters and insoluble fillers can be applied to surfaces submerged in water for securing thereto, in situ, a wide variety of metallic and non-metallic substances.

24 Claims, No Drawings

3,896,077

UNDERWATER ADHESIVE

CROSS-REFERENCE TO RELATED APPLICATIONS

This is a continuation of Ser. No. 857,538 (now U.S. Pat. No. 3,607,542), filed Sept. 12, 1969, which is a continuation-in-part of Ser. No. 699,062, filed Jan. 19, 1968, now abandoned, which is a continuation-in-part of Ser. No. 586,316, filed Oct. 10, 1966, now abandoned.

BACKGROUND OF THE INVENTION

1. Field of the Invention

This invention relates to compositions capable of being applied to surfaces submerged in water to secure together a wide variety of metallic and non-metallic solid substances, e.g., glass, aluminum, steel, stainless steel, plastics, rubber and wood. The compositions of this invention are useful for underwater repair of ships and other structures, and sealing in place underwater demolition charges and explosives. They also have health field applications, e.g., dental, such as fillings for teeth; for this purpose n-butyl-α-cyanoacrylate is the preferred monomer and calcium carbonate is the preferred filler. The invention includes the preparation and a particular application of said compositions.

2. Description of the Prior Art

Adhesive compositions are generally useless for application under water, in the main, because the film of water on the substrate surface prevents its being wetted by the adhesive. Previously known compositions either dissolve in water, float away from the surfaces to be joined or, in the case of various adhesive monomers, polymerize instantaneously on contact with water or too slowly to be of substantial utility.

Several prior art patents and publications in the field of α-cyanoacrylate adhesives are of interest. U.S. Pat. No. 2,794,788 issued to Coover et al. on June 4, 1957 (application filed Nov. 1, 1952) relates to adhesive compositions containing certain monomeric esters of α-cyanoacrylic acid and to their methods of use. Coover et al. ('788) describes adhesive compositions which are stable in bulk, but which autopolymerize when spread in a thin film and which chemically comprise a monomeric ester of α-cyanoacrylic acid having the general formula $CH_2 = C(CN)-COOR$, wherein R may be an alkyl group of 1 to 16 carbon atoms, cyclohexyl or phenyl. The compositions additionally contain, as a stabilizer against polymerization in bulk, sulfur dioxide in a concentration of 0.001 to 0.06% by weight. The patent states that "viscosity regulators" which are soluble in monomeric alkyl α-cyanoacrylates may be employed in the adhesive compositions.

U.S. Pat. No. 2,765,332 issued to Coover et al. on Oct. 2, 1956 (application filed Feb. 11, 1954) describes an adhesive composition similar to Coover et al. ('788) but with the improvement of adding 0.001 to 0.05% by weight of hydroquinone as a stabilizer. Coover et al. ('332) also contains a similar description of "viscosity regulators" (polymeric materials which are soluble in the monomer).

U.S. Pat. No. 2,784,127 issued to Joyner and Coover (Joyner et al.) on Mar. 5, 1957 (application filed June 2, 1954) describes adhesive compositions using the basic monomeric α-cyanoacrylate esters described in the Coover et al. ('788 and '332) patents, but with the improvement of adding one or more ester "plasticizers" which are soluble in the α-cyanoacrylate monomer as described therein. Joyner et al. also states that: "The adhesive compositions can contain any of the other compounding ingredients which are normally employed such as viscosity modifiers, coloring agents, fillers, pigments and the like." (col. 5, lines 28–33). No explicit exemplification is found for the term "fillers", and the term "fillers", standing alone, would include both water-soluble and monomer-soluble materials.

U.K. Pat. No. 1,000,665 filed in 1962 by Eastman Kodak Co. and published on Aug. 11, 1965, discloses methods of using the basic adhesive compositions, monomeric α-cyanoacrylate esters described in the Coover et al. ('788 and '332) patents, but with the additional step of applying an epoxide to one of the surfaces to be bonded. This U.K. patent also describes how the "monomers may be thickened by incorporation therein of polymeric materials . . ." (p. 3, line 24).

Finally in the prior art patents, U.S. Pat. No. 3,483,870 issued to Coover et al. on Dec. 16, 1969 (application filed Apr. 22, 1963) describes a method for surgical bonding of body tissues which comprises applying to one of the tissue surfaces an adhesive composition comprising the basic monomeric esters described in Coover et al. ('788 and '332) and Joyner et al., and the additional step of applying to one tissue surface a basic organic nitrogen compound from the class consisting of vasoconstrictors and local anesthetics. Coover et al. ('870) also reiterates (at col. 5, lines 1–13) the monomer-soluble "suitable thickening agents and viscosity modifiers" of Coover et al. ('788 and '332) and the monomer-soluble "plasticizers" of Joyner et al. Coover et al. ('870) states that surgical grades of absorbable cellulose may be used "to absorb body fluids and aid in obtaining a dry field for the adhesive" (col. 5, lines 51–53), and the patent states that "the presence of body fluids on the surfaces to be joined has been a factor that has caused the α-cyanoacrylate monomers to be less successful as surgical adhesives in some instances than would be desired" (col. 2, lines 35–39). This statement indicates the awareness in the prior art of the water reactivity of the α-cyanoacrylate monomers. This means that in the presence of water the monomers polymerize before the surfaces to be bonded can be brought together.

It is interesting to note that the Coover et al. ('788, '332 and '870) patents, the Joyner et al. patent and the U.K. patent are all assigned to Eastman Kodak Co. It is also informative to mention some printed publications published by Eastman Kodak Co. on the subject of Eastman 910 adhesive. Eastman 910 contains methyl-α-cyanoacrylate, which may also be named as methyl-2-cyanoacrylate. Eastman Kodak Bulletin No. R-103 (1958) has on p. 2 a discussion of "Preparation of Bonding Surfaces", where it is stated: "As do most adhesives, Eastman 910 Adhesive works best when the bonding surfaces are thoroughly cleaned and dried prior to the application of the adhesive." The foregoing statement again demonstrates the prior art knowledge that α-cyanoacrylates react very rapidly and readily with water—polymerizing before the surfaces to be bonded can be brought together. Eastman Kodak Co. published another brochure about Eastman 910 in 1966. This 1966 publication discusses "Preparation of Bonding Surfaces" on p. 4, where it is again stated: "As with most adhesives, Eastman 910 Adhesive performs best when it is used to bond surfaces which have been thoroughly cleaned and dried prior to the application of the adhesive." Further on p. 4, when discussing the preparation of ALUMINUM surfaces for bonding, the brochure states: "After being cleaned, the parts should be rinsed with water and dried prior to the formation of the bond."

In summary, the prior art reveals that α-cyanoacrylate ester monomers have been known for 15 years, but none of the prior art suggests an adhesive composition which may be successfully applied in the presence of water. While the prior art, such as Joyner et al., broadly teaches "fillers", it has never occurred to those skilled in the art to use a filler which is insoluble in water and insoluble in the monomer to make a paste-like composition which will bond under water.

SUMMARY OF THE INVENTION

The compositions of this invention contain, as essential ingredients, at least one liquid monomer of a class known as α-cyanoacrylic acid esters and at least one water-insoluble weakly alkaline to acid filler which is, effectively, inert with respect to the monomer and essentially insoluble therein. The filler is admixed with the liquid monomer to form a thickened paste-like mixture which remains integral under water and does not flow away from the site of application. Suitable pastes contain, e.g., from 1 to 3 parts by weight of monomer, from 1 to 3 parts by weight of filler and from 0 to 0.3 part by weight of finely divided silica.

Accordingly, it is an object of this invention to provide a composition which is an adhesive paste capable of being applied to a surface submerged in water. Another object is to provide an adhesive mixture capable of joining, in situ, two surfaces submerged in water, the surfaces being of the same or different materials. A further object is to provide an adhesive composition which will neither dissolve in water, flow away from the site of application in water, harden immediately on contact with water nor take unduly long to harden when submerged in water. An additional object is to provide an adhesive mixture which, when applied under water, will permit a reasonable working time for underwater application and will harden substantially uniformly. A still further object is to provide an underwater adhesive which can develop high bond strengths within one minute after application. These and other objects, readily apparent with reference to the following description, are achieved by the subject invention.

DESCRIPTION OF THE PREFERRED EMBODIMENTS

The liquid α-cyanoacrylate monomers used for this invention are of the formula $H_2C=C(CN)-CO-OR$, wherein R is, preferably, alkyl having from 1 to 10 carbon atoms, e.g., methyl, ethyl, propyl, isopropyl, butyl, isobutyl, amyl, pentyl, hexyl, heptyl ethylhexyl, octyl, nonyl and decyl. From among these, it is particularly advantageous to employ those wherein R is alkyl having from 4 to 8 carbon atoms, either straight or branched chain. R is, alternatively, substituted alkyl having from 1 to 10 carbon atoms. The substituents are unlimited as long as the monomers are liquid. Illustrative substituents are lower alkoxy having from 1 to 4 carbon atoms [ethoxyethyl-α-cyanoacrylate] and halo, e.g., chloro and fluoro [trifluoro-isopropyl-α-cyanoacrylate]. (In the trifluoro-isopropyl group the three fluorine atoms are bonded to the same carbon atom.) In addition R can also be, e.g., cyclohexyl, phenyl or allyl. The sole restrictions on R are that the monomer must be liquid at room temperature (20°C.) and atmospheric pressure and a carbon atom of R must be directly bound to the $H_2C=C(CN)-CO-O-$ group. It is also essential that the α-cyanoacrylate be unsubstituted in the β-position. That means that the hydrogen atoms in the β-position cannot be replaced. The contemplated α-cyanoacrylates must have the structure:

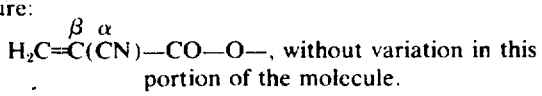

$H_2C=C(CN)-CO-O-$, without variation in this portion of the molecule.

The liquid α-cyanoacrylates are monomers prepared, e.g., according to the method disclosed by U.S. Pat. No. 2,763,677 (hereafter: Jeremias). The precursors are either known or are available from known starting materials following published procedures. Where R is alkyl, monomers prepared according to the Jeremias procedure have purities of 98.5 per cent or higher.

The pH designated for the monomer is measured by adding one gram of monomer and 0.2 gram of sodium chloride to 50 cubic centimeters of water. The mixture is then stirred and the pH checked with a standard pH meter or other laboratory indicator. It has been found that the pH is a critical factor. A range of from 2.45 to 4.1, preferably from 3.0 to 4.1, permits a good homogenous mixture with inorganic fillers, such as calcium carbonate and amorphous silica. As the pH is increased above 4.1, clumping occurs (depending upon the alkalinity of the filler); at a pH below 3.7 homogenous pastes are prepared, but delayed curing time results. This is advantageous for those monomers which polymerize most rapidly on contact with water. These have preferred pH's, e.g., methyl-α-cyanoacrylate (pH 2.45), ethyl-α-cyanoacrylate (pH 2.7) and propyl-α-cyanoacrylate (pH 2.7), below 3.7. It has also been found that in particular aqueous media, e.g., sea water that has contamination of a type which is not readily determined, tensile strengths may be improved by reducing the pH below the range of from 3.7 to 4.1. Particular substrates, e.g., HY-80 steel, also adhere more strongly at lower pH's. Propyl-α-cyanoacrylate has been found to yield particularly good results (strong bonds) with HY-80 steel.

The pH is controlled, e.g., by adding sulfur dioxide to the monomer during distillation in accord with Jeremias' disclosure or by adding sulfur dioxide to the monomer after distillation. In lieu of sulfur dioxide other acidic inhibitors (against anionic polymerization), such as nitric oxide, nitrous oxide, carbon dioxide, hydrogen fluoride, trichloroacetic acid and acetic anhydride, can be used to stabilize the monomer. (Carbon dioxide is recommended only for monomers wherein R has at least four carbon atoms.) In combination with the acidic inhibitor a free radical inhibitor, such as hydroquinone, monomethylether of hydroquinone, picric acid and t-butyl-catechol, should be concurrently employed. The monomethylether of hydroquinone is the preferred stabilizer against free radical polymerization. Moreover, it imparts good color stability to both the monomeric α-cyanoacrylate and the polymerized product therefrom. This has critical significance in the health field. Free radical inhibition is obtained with, e.g., 10 parts of the monomethylether of hydroquinone per million parts of α-cyanoacrylic acid ester; in practice from 15 to 200 parts per million are employed.

As the number of carbon atoms in the alkyl chain of R is increased, the hydrophobicity of the monomers is increased. The methyl, ethyl and propyl esters are relatively hydrophillic and require a lower pH to make their use practical. These, as the monomers in the paste compositions at the above-noted preferred pH's, are effectively delivered through, e.g., a polyethylene delivery tube to a surface of, e.g., a submerged steel jig to be glued under water, a steel jig counterpart being immediately placed on said delivered paste.

Although the butyl and amyl esters are more hydrophobic than the methyl, ethyl and propyl and generally more satisfactory to use, the hexyl, heptyl and octyl-$\alpha$-cyanoacrylates are most satisfactory both from the standpoint of optimum working time and resistance of the resulting adhesive bond to subsequent hydrolytic degradation.

The amyl and hexyl homologs are preferred for underwater applications in view of their ease of handling, preparation and obtainable tensile strengths.

The filler is insoluble weakly alkaline to acid material essentially inert with respect to the liquid $\alpha$-cyanoacrylate ester monomer. Exemplary fillers are calcium carbonate, calcium sulfate dihydrate, calcium sulfate, titanium dioxide, zinc oxide, zinc hydroxide, calcium oxide, magnesium oxide, stannic oxide, stannous oxide, aluminum oxide, aluminum silicate, calcium silicate, zinc silicate, calcium aluminate, mercuric oxide, silver oxide, cuprous oxide, cupric oxide, strontium oxide, ferrous oxide, ferric oxide, zinc phosphate, calcium phosphate, aluminum phosphate, talc, barium sulfate, barium carbonate and calcium sulfate hemihydrate. These are best employed in a finely divided state so that they can most readily be admixed with the liquid monomer to form a paste. The preferred fillers are those which are neutral to weakly alkaline. Although silica does not readily mix with monomer to form a paste, it is advantageously employed in conjunction with other fillers, e.g., to control the fluidity of the paste.

The preferred fillers are either calcium carbonate alone or a mixture of calcium carbonate and amorphous silica. The preferred amorphous silica is a fine colloidal size silica of 99% purity prepared in a rapid, high temperature flame process as a white soot and sold under the name "Cab-O-Sil" (trademark) by Geoffry Cabot Company. For stable pastes with chemically pure barium carbonate, the pH designated for the monomer (according to the indicated testing procedure) is optimally 3.0 for higher homologs, i.e., amyl and above.

Although each of the above-noted fillers is inorganic and inorganic fillers are preferred, organic fillers can be used in lieu thereof. An organic filler can, but need not, be a pigment, such as carbon black. Different effects are obtained with different fillers in different concentrations. The fillers are solids other than organic polymers since the latter ordinarily are soluble in $\alpha$-cyanoacrylates and therefore do not form suitable pastes. All fillers which are (a) essentially inert with respect to the employed $\alpha$-cyanoacrylate, (b) insoluble in the employed $\alpha$-cyanoacrylate, (c) insoluble in water and (d) form pastes with said $\alpha$-cyanoacrylate are effective in forming compositions which are useful in adhering together two surfaces submerged in water.

The term "insoluble" is relative. Although it is said that there is no substance which is completely insoluble in water, the expression "water-insoluble" is employed in technical writings and is readily understood. The expression "water-insoluble+ is used herein to define fillers having a water solubility (at room temperature) no greater than 1 gram/100 milliliters. For ease of handling it is well to employ filler having a solubility in water of less than 0.5 gram (g)/100 milliliters (ml) of water or, preferably, less than 0.01 g/100 ml of water at room temperature.

The filler must also be essentially insoluble in the $\alpha$-cyanoacrylate so that the adhesive composition will be in the form of a paste. By "paste" or "paste-like" is meant a dispersion in a liquid $\alpha$-cyanoacrylate of solid particles of filler which is essentially insoluble therein. The paste may vary in consistency. It is preferred that the paste have only a slight tendency to flow of its own volition and yet be such that it can readily be caused to flow or spread. The paste should not be watery and should remain integral when delivered to a submerged substrate. Dispersions having the consistency of toothpaste or even more fluid are easiest to work with. The paste preferably has a density greater than that of water.

The particle size of the filler is not critical beyond the general requirements for fillers in solid-in-liquid dispersions capable of flow. The range of average particle size is ordinarily between 100 and 300 mesh, but a much broader range is suitable for the intended purpose.

The underwater adhesive compositions are not limited to liquid-$\alpha$-cyanoacrylate monomer and inorganic (or organic) fillers. It is also possible to use a liquid $\alpha$-cyanoacrylate monomer having dissolved therein an organic polymer, such as up to 10% by weight of poly(methylmethacrylate) or poly($\alpha$-alkyl cyanoacrylate) or up to 25% by weight of liquid unsaturated polyester, and filler. Exemplary compositions of this type are:

| | | | |
|---|---|---|---|
| A. | n-butyl $\alpha$-cyanoacrylate | | 3.0 grams (g) |
| | Poly(methylmethacrylate) | [molecular weight= 50,000 to 100,000] | 0.15 g |
| | Calcium carbonate | — | 2.7 g |
| | Silica | | Up to 0.3 g as desired for suitable paste viscosity |
| B. | Propyl $\alpha$-cyanoacrylate | 4 pt. | 2.4 g |
| | Polyester Resin (R and H) | P-43 [0.75 to 0.80 pt.] | 0.45 to 0.48 g |
| | | P-13 [0.25 to 0.20 pt.] | 0.15 to 0.12 g |
| | MEK Peroxide | [0.02 pt.] | 0.0012 g |
| | Calcium Carbonate | | 2.7 |

When formulation B is employed on painted surfaces submerged in sea water, bond strengths of from 100 to 125 pounds per square inch are obtained. [The abbreviation "pt." is used for parts by weight.]

The pastes of this invention are applied to a surface submerged in water, as, e.g., a glob. (Said pastes are equally effective in fresh water and in sea water.) The other surface to be adhered is then pressed over the glob against the first surface and held there for a period of up to five minutes.

To deliver the paste to the surface to which it is to be applied, it is preferably placed in a tube and squeezed through a nozzle or throat onto said surface.

Tests were conducted with compositions of this invention wherein (a) a second surface is immediately pressed against a first surface to which paste has been applied, (b) a second surface is pressed against a first surface one minute after a glob of paste has been placed on the first surface, and (c) a second surface is pressed against a first surface two minutes after a glob of paste has been placed on the first surface, all surfaces being submerged in water. The strength of the resulting bonds was then tested. All bond tension tests were carried out with a Baldwin Universal Testing Machine at a jaw separation speed of 0.05 inch per minute.

In the examples which follow, a paste is made by adding the stated filler to the specified liquid α-cyanoacrylate. When a plurality of fillers are used, they can be admixed with the α-cyanoacrylate sequentially in any order or as an admixture. In the actual examples, the amorphous silica is added last. Alternatively, the monomer can be added to the filler. The α-cyanoacrylate is prepared according to the method of Jeremias (U.S. Pat. No. 2,763,677) and contains an acidic inhibitor against anionic polymerization. The pH designated for said α-cyanoacrylate (containing the acidic inhibitor) is the pH obtained by mixing 1 gram of the α-cyanoacrylate and 0.2 gram of sodium chloride in 50 milliliters of distilled water. Said pH is 3.7 except for Example 19, where it is 3.0; Example 24, where it is 2.7; and Example 39, where it is 4.15.

The paste formed from the admixture of filler with the α-cyanoacrylate (monomer) is stirred until smooth and then placed in a squeeze tube from which it is spread, under water, on one of the two surfaces to be adhered. The other of said two surfaces is then pressed for from two to three minutes against the paste on said one surface.

| EXAMPLE | Monomer[j] α-cyanoacrylate | Filler[i] | grams | Paste Flow | Surfaces** | Average Bond Strength in Tension (psi) |
|---|---|---|---|---|---|---|
| 1* | octyl | $CaCO_3$ | 3.4 | | | 201[a] 110[b] |
| 2* | heptyl | $SiO_2$ $CaCO_3$ | 0.3 2.7 | fair excellent | | 187[c] 100[a] 175[b] 250[c] |
| 3* | heptyl | $CaCO_3$ $SiO_2$ | 2.6 0.1 to 0.2 | | | 475[a] 410[b] |
| 4 | heptyl | $CaCO_3$ | 3.4 | | | 609[a] 710[b] |
| 5 | heptyl | $CaCO_3$ | 2.7 | | rubber/steel rubber/wood glass/glass | 74[f] 31[f] [d] |
| 6* | hexyl | $CaCO_3$ | 2.5 | good | | 225[a] 135[b] 112[c] |
| 7* | amyl | $CaCO_3$ | 3.5 | fair | | 253[a] 80[b] 150[c] |
| 8* | butyl | $CaCO_3$ | 2.0 | very thin and fluid | | 420[a] |
| 9 | nonyl | $CaCO_3$ $SiO_2$ | 2.7 0.05 | | | 210 |
| 10 | decyl | $CaCO_3$ $SiO_2$ | 2.7 0.05 | | | 200 |
| 11 | cyclohexyl | $CaCO_3$ $SiO_2$ | 2.7 0.05 | | | 885 |
| 12 | ethoxyethyl | $CaCO_3$ $SiO_2$ | 2.7 0.1 | | | 270 |
| 13 | isobutyl | $CaCO_3$ $SiO_2$ | 2.7 0.05 | | g | 260 |
| 14 | isopropyl | $CaCO_3$ $SiO_2$ | 2.7 0.05 | | | 360 |
| 15 | 2-ethylhexyl | $CaCO_3$ $SiO_2$ | 2.7 0.05 | | | 310 |
| 16 | propyl[h] | $CaCO_3$ $SiO_2$ | 2.6 0.1 | | | 200 |
| 17 | ethyl[h] | $CaCO_3$ $SiO_2$ | 2.7 0.1 | | | 75 |
| 18 | methyl[h] | $CaCO_3$ $SiO_2$ | 2.7 0.1 | | | 75 |
| 19 | hexyl | $BaCO_3$ $SiO_2$ | 2.7 0.1 | | | 750 |
| 20 | 2-ethylhexyl | $CaSO_4 \cdot 2H_2O$ $SiO_2$ | 2.0 0.1 | | | 210 |
| 21 | butyl | $CaSO_4 \cdot \frac{1}{2}H_2O$ $SiO_2$ | 3.0 0.1 | | | 80 |
| 22 | allyl | $CaCO_3$ $SiO_2$ | 2.7 0.1 | | | 250 |
| 23 | n-hexyl and n-amyl | $BaCO_3$ $SiO_2$ | 2.7 0.1 | | | 400 |

Table —Continued

| EXAMPLE | Monomer[j] α-cyano-acrylate | Filler[i] | grams | Paste Flow | Surfaces** | Average Bond Strength in Tension (psi) |
|---|---|---|---|---|---|---|
| 24 | trifluoro-isopropyl | CaCO₃ | 2.7 | | | 155 |
| | | SiO₂ | 0.1 | | | |

**All examples adhere two stainless steel surfaces under fresh water, unless otherwise specified
*Salt water used in this sample
ᵃImmediate sealing
ᵇSealing after a 1-minute immersion
ᶜSealing after a 2-minute immersion
ᵈGlass slides broke, precluding reading
ᵉBond strengths as high as 580 psi obtained in individual tests
ᶠPeel strength; rubber peeled from steel and wood substrates
ᵍHeld together for only one minute under water
ʰPaste delivered as a glob through a polyethylene tube to one of the two steel surfaces held under water
ⁱAll silica (SiO₂) used in the examples in conjunction with the filler is amorphous silica
ʲIn each example 3.0 grams of monomer are used, except in Example 1 where 6.1 grams of monomer are used; in Example 23, 1.5 grams of each monomer are employed. Each alkyl is normal unless otherwise specified.

Heptyl-α-cyanoacrylate admixed with calcium carbonate (CaCO₃) and amorphous silica (as in the examples) was also found to form strong bonds (under water) of aluminum to aluminum. In the same manner wood/wood and rubber/rubber bonds were formed. Although there may be some variation in maximum tensile or shear strengths and the optimum pH may differ, strong bonds are likewise formed under water for glass/glass, plastic/plastic (phenol/formaldehyde thermoset plastic) and combinations of the noted substrates, e.g., steel/aluminum, plastic/glass and wood/painted steel.

Employing a paste prepared from 4.0 parts by weight of hexyl- α-cyanoacrylate (pH 3.7), 3.6 parts by weight of calcium carbonate and 0.2 part by weight of "Cab-O-Sil", additional bonds are prepared under water as set forth in Examples 25 to 32. In these examples all test specimens (except those with corroded or painted surfaces) are prepared for adhesive bonding by vapor degreasing for five minutes with trichloroethylene. This is followed by a hot water rinse and then a final wash in methyl ethyl ketone.

The procedure for each test (run) in Examples 25 to 32 is as follows:
a. Water in a container is regulated at the indicated temperature;
b. Test specimens are submerged in the water;
c. Adhesive is applied to bonding surface of one submerged test specimen;
d. Adhesive is spread over entire bonding area by sliding test specimens over one another;
e. Moderate hand pressure (approximately 1 pound) is applied between bonding surfaces for a time interval A;
f. Bonded test specimens removed from water and placed in Dillon Dynamometer for pull tests;
g. Load applied between test specimens; time interval B is the interval between conclusion of time interval A and application of load.

The adhesive cure begins immediately upon contact with water. Up to two minutes are available following application to spread the adhesive and bring the bonding surfaces together.

All ingredients are stored in closed containers. The hexyl-α-cyanoacrylate is packaged in a polyethylene bottle. Cardboard cans are used to package the amorphous silica and the calcium carbonate.

The mixed adhesive paste can be readily applied from its collapsible squeeze tube container for a period up to four hours.

The following portions of Federal Test Standard 175, Adhesive Methods of Testing, are used for performing the physical tests:
Method 1011.1-Tensile Properties of Adhesives
Method 1033.1-T-Shear Strength Properties of Adhesives by Tensile Loading.

All tests for each example are performed on the same day with the same adhesive batch. The bond area for each test is one square inch. 7.8 grams of mixed adhesive composition is adequate for approximately 20 thin film tests.

The aluminum alloy employed in each of Examples 25 through 32 is aluminum alloy AA6061-T6 anodized per Mil-A-8625 and having a surface roughness of [32]. In each of said examples the steel is steel per Mil-S-16216, Grade HY-80; in Examples 25, 28, 29, 31 and 32 the surface roughness is [32]; in Examples 26 and 30 the surface bonded is badly oxidized to a finish of approximately [125]; in Example 27 the surface bonded is painted per NAVORD USTD 52, System No. 48(antifouling).

EXAMPLE 25

Steel is adhered to anodized aluminum alloy submerged in a 3% solution of salt (NaCl) water having a temperature of 70°F. Ten repetitions produce the following results:

| | A* | B** | Tensile Strengths (psi) |
|---|---|---|---|
| a | 45 | 37 | 90 |
| b | 45 | 75 | 375 |
| c | 45 | 48 | 190 |
| d | 45 | 81 | 325 |
| e | 45 | 55 | 425 |
| f | 45 | 44 | 275 |
| g | 45 | 57 | 450 |
| h | 45 | 42 | 125 |
| i | 45 | 62 | 475 |
| j | 45 | 47 | 625 |
| | | Average | 335 |

*Time in seconds to prepare specimen bond
**Time in seconds (unless otherwise specified) from bond preparation to the application of load in testing

EXAMPLE 26

Badly oxidized steel is adhered to anodized aluminum alloy submerged in tap water having a temperature of 70° F. [In this example and in Examples 27 through 32 A and B have the same meanings as indicated in the respective footnotes in Example 25.] Five tests yield the following results:

|   | A | B | Tensile Strengths (psi) |
|---|---|---|---|
| a | 45 | 105 | 390 |
| b | 45 | 105 | 290 |
| c | 45 | 105 | 440 |
| d | 45 | 105 | 450 |
| e | 45 | 105 | 475 |
|   |   | Average | 409 |

EXAMPLE 27

Painted steel is adhered to anodized aluminum alloy submerged in tap water having a temperature of 70° F. In each of five tests A is 45 seconds and B is 105 seconds; the respective tensile strengths are 240 psi, 225 psi, 230 psi, 265 psi and 320 psi. An average tensile strength of 256 pounds per square inch is thus obtained.

EXAMPLE 28

Steel is adhered to anodized aluminum alloy submerged in tap water having a temperature of 70° F. In each of ten tests A is 45 seconds. Other data follow:

|   | B | Tensile Strength (psi) |
|---|---|---|
| a | 81 | 400 |
| b | 109 | 740 |
| c | 69 | 420 |
| d | 71 | 90 |
| e | 44 | 620 |
| f | 54 | 910 |
| g | 104 | 525 |
| h | 75 | 680 |
| i | 76 | 610 |
| j | 47 | 625 |
|   | Average | 562 |

EXAMPLE 29

In Examples 29 to 32 shear specimens are prepared from rectangular slides having an overlapping bond area of 1 inch$^2$. Adhesive paste of the same composition as that employed for Examples 25 to 28 is applied to the slides in the same manner as it is applied to the substances therein indicated. The details of Example 29 are the same as those of Example 28 except as otherwise specified. In each of ten tests A is 45 seconds and B is 105 seconds. The respective shear strengths in pounds per square inch are: 500, 260, 345, 365, 410, 415, 230, 280, 320 and 440, the average of which is 361 psi.

EXAMPLE 30

Badly oxidized steel is adhered to anodized aluminum alloy submerged in tap water having a temperature of 70° F. In each of ten runs A is 45 seconds and B is 105 seconds. The respective shear strengths in pounds per square inch are: 405, 415, 430, 475, 405, 460, 465, 425, 400 and 410, the average of which is 429 psi.

EXAMPLE 31

Steel having a surface roughness of $^{32}$ is adhered to anodized aluminum alloy submerged in tap water having a temperature of 32° F. In each of ten runs A is 45 seconds and B is 105 seconds. The respective shear strengths in pounds per square inch are: 355, 275, 395, 270, 350, 445, 340, 430, 135 and 430, the average of which is 342 psi.

EXAMPLE 32

Steel is adhered to anodized aluminum alloy submerged in tap water having a temperature of 70°F. For these tests the thickness of the adhesive layer between the two substrates is 0.062 inch. In each of three runs A is 120 seconds and B is 60 minutes. The respective shear strengths in pounds per squard inch are: 65, 110 and 75, the average of which is 83 psi.

EXAMPLES 33 to 38

Following the same procedure as that employed for Examples 1 to 24 and using a paste prepared from 3.0 grams of n-hexyl-α-cyanoacrylate, 2.7 grams of chemically pure (C.P.) calcium carbonate and 0.1 gram of amorphous silica, bonds are made under tap water in less than 1 minute between standard A.S.T.M. 1-inch square jigs of the stated materials. Resulting tensile strengths are noted in pounds per square inch in the following table:

| Example | Substrates | Tensile Strength (psi) | |
|---|---|---|---|
| 33 | wood to wood (maple) | 300 | 370 |
| 34 | plastic to plastic (phenolic) | 250 | 270 |
| 35 | rubber stopper to wood (maple) |  | 31* |
| 36 | rubber to steel |  | 74* |
| 37 | painted steel to painted steel |  | 680 |
| 38 | aluminum to aluminum |  | 340 | note: *The result is actually that for a peel test since the rubber stretches and peels from the substrate to which it is adhered.

EXAMPLE 39

Following the same procedure as that employed for Examples 1 to 24 and using paste prepared from 3.0 g of hexyl α-cyanoacrylate and 1.0 g of decolorizing charcoal (Atlas Chemical Co., Wilmington, Delaware), bonds made under tap water in less than 1 minute between standard A.S.T.M. 1-inch square stainless steel jigs displayed tensile strengths of 140 psi.

EXAMPLE 40

EXPERIMENTAL

I. Compositions ($a$) through ($h$) in the table below were prepared with n-hexyl-α-cyanoacrylate having a pH of 3.17. To this monomer the indicated amount of calcium carbonate ($CaCO_3$) was added; the monomer and $CaCO_3$ were admixed until the resultant was essentially uniform. The specified amount of amorphous silica ($SiO_2$) was then thoroughly admixed therewith to form as smooth and as homogeneous a product as possible with a spatula. The pH was determined in the manner set forth earlier.

The product was then placed in a squeeze tube with a nozzle from which it was spread, under water, directly on a first planar vertical surface of a stainless steel specimen. A corresponding planar vertical surface of a second stainless steel specimen also under water was then pressed for 30 seconds against the first planar surface.

All procedures and starting materials were essentially identical except insofar as differences are specifically noted.

II. A 10% (w/v) solution of polymethylmethacrylate (L.D.Caulk Co.) in n-hexyl-α-cyanoacrylate was prepared. The solution was placed in a squeeze tube with a nozzle and applied as in I to adhere two stainless steel specimens together. After bringing the two planar specimen surfaces together, however, the surfaces were held together for 10 minutes.

TESTS

Each pair of stainless steel specimens which adhered together were subjected to tensile tests. The results are shown in the following table:

COMPOSITIONS AND RESULTS

| I. | Monomer grams(g) | SiO$_2$ (g) | CaCO$_3$ (g) | Dispersion | Adhesion (psi) |
|---|---|---|---|---|---|
| (a) | 3.0 | 0.1 | 1.0 | watery | 0[1] |
| (b) | 3.0 | 0.2 | 1.0 | thin paste | 200 |
| (c) | 3.0 | 0.2 | 2.0 | paste | 140 |
| (d) | 3.0 | 0.2 | 3.0 | paste | 160 |
| (e) | 3.0 | 0.2 | 4.0 | paste | 135 |
| (f) | 3.0 | 0.2 | 5.0 | thick paste | 35 |
| (g) | 3.0 | 0.2 | 6.0 | thick paste | 30 |
| (h) | 3.0 | 0.2 | 7.0 | friable mass[2] | 0 | note:
[1] did not wet stainless steel surface
[2] very thick; not smooth.
Each paste [(b) to (g)] wetted and held to the surface to which it was applied.

DISCUSSION

The selected α-cyanoacrylate and pH are typical, as are dispersions with the amorphous silica and the calcium carbonate actually employed. The compositions were prepared, not to achieve the highest possible adhesion, but to demonstrate the entire range of dispersions from that which is clearly fluid, through a range of paste-like compositions, to a very thick friable mass. There is no reason to believe that any other inert water- and monomer-insoluble filler(s) would present a different over-all result.

The amounts of monomer and silica were selected in an attempt to keep these figures constant. Since composition (b) was already a paste, the amount of silica therein was reduced to obtain the closest comparable composition which could not be considered a paste.

Polymethylmethacrylate is soluble in the monomer and thus forms a solution, rather than a dispersion, with the monomer. Since the polymethylmethacrylate is solid, increasing the proportion thereof results in the preparation of a gel. The polymethylmethacrylate employed is representative of monomer-soluble fillers and there is no reason to believe that any other monomer-soluble filler would yield a different result.

Stainless steel test specimens were selected as having typical non-porous inert surfaces which could be and were made uniformly planar so that the testing conditions would be as uniform as possible. All test surfaces were thoroughly cleaned. There is no reason to believe that any other non-porous inert planar surface would yield materially different results as long as the material could withstand the force required to measure the adhesion of the formed bond.

The surface to which each composition was applied was maintained in a vertical position so that the results obtained would be independent of the relative density of the composition to that of the water.

All paste or paste-like compositions remained integral when delivered to the submerged substrate to which they were applied under water. The dispersion with 0.1 gram of silica (a) was a fluid mix with a watery consistency. The composition with 7 grams of calcium carbonate (h) could not truly be regarded as a dispersion; it was more nearly composed of monomer-wetted clumps of filler particles.

Dispersion (a) did not remain integral adjacent the surface to which it was applied.

The paste or paste-like compositions are smooth and uniform; they wet and adhere to a non-porous surface to which they are applied under water. They are useful to adhere together substrates which are submerged in water, whereas neither watery dispersions e.g., (a), nor friable masses, e.g., (h), are useful from a practical standpoint for such purpose.

Fillers which are soluble in the monomer form solutions with the monomer and do not yield useful underwater adhesives.

Compositions of this invention have a paste-like consistency and are capable of (1) being applied to a substrate submerged in water, (2) adhering together two substances submerged in water and (3) achieving a bond strength between the two substrates of at least 100 pounds per square inch in less than 1 hour.

To one versed in the adhesive art, it is exceedingly surprising that strong adhesive bonds can be achieved under water. It is also surprising, knowing the properties of methyl-α-cyanoacrylate, that this family of anionically initiated monomers may be utilized at all under water at neutral or alkaline pH. It had generally been accepted that the methyl ester was too reactive in water. The longer chain esters, however, permit more working time for the preparation of good adhesive joints.

The invention and its advantages are readily understandable from the foregoing description. It is apparent that various changes may be made in the processes and compositions without departing from the spirit and scope of the invention or sacrificing its material advantages, the processes and compositions hereinbefore described being merely illustrative of preferred embodiments of the invention.

We claim:

1. A composition having a paste-like consistency and containing, as essential ingredients, (a) at least one β-unsubstituted α-cyanoacrylic acid ester which is liquid at room temperature and atmospheric pressure, the α-cyanoacrylic acid ester consisting of the acyl group H$_2$C=C(CN)—CO—O— and a group a carbon atom of which is directly bound to the available bond of an oxygen atom of said acyl group, and (b) water-insoluble solid filler which is essentially inert with respect to the α-cyanoacrylic acid ester and insoluble therein, the filler being capable of forming a paste-like consistency with the α-cyanoacrylic acid ester and being present in the composition in an amount sufficient to form the paste-like consistency.

2. A composition according to claim 1 having 1 to 3 parts by weight of the ester, from 1 to 3 parts by weight of the filler and from 0 to 0.3 part by weight of finely divided silica.

3. A composition according to claim 2 wherein each ester is an alkyl ester.

4. A composition according to claim 3 wherein the alkyl of at least one ester has from 1 to 3 carbon atoms.

5. A composition according to claim 4 wherein the sole ester is propyl-α-cyanoacrylate.

6. A composition according to claim 3 wherein the alkyl of at least one ester has from 4 to 8 carbon atoms.

7. A composition according to claim 2 wherein each α-cyanoacrylic acid ester is a monomer of the formula $$H_2C=C(CN)-CO-OR$$

wherein R is a member selected from the group consisting of alkyl having from 1 to 10 carbon atoms; alkoxyalkyl having from 1 to 10 atoms, the alkoxy having from 1 to 4 carbon atoms; cyclohexyl; phenyl and allyl.

8. A composition according to claim 7 in which said filler comprises at least one member selected from the group consisting of calcium carbonate, calcium sulfate dihydrate, calcium oxide, calcium sulfate, titanium dioxide, zinc oxide, zinc hydroxide, magnesium oxide, stannic oxide, stannous oxide, aluminum oxide, aluminum silicate, calcium silicate, zinc silicate, calcium aluminate, mercuric oxide, silver oxide, cuprous oxide, cupric oxide, strontium oxide, ferrous oxide, ferric oxide, zinc phosphate, calcium phosphate, aluminum phosphate, talc, barium sulfate, barium carbonate and calcium sulfate hemihydrate.

9. A composition according to claim 2 wherein the filler is inorganic and weakly alkaline.

10. A composition according to claim 2 wherein the filler is inorganic and neutral.

11. A composition according to claim 2 wherein the filler is inorganic and acidic.

12. A composition according to claim 2 wherein the filler comprises at least one member selected from the group consisting of calcium carbonate, calcium sulfate hemihydrate, calcium sulfate dihydrate, calcium sulfate and barium carbonate.

13. A composition according to claim 2 containing finely divided amorphous silica.

14. A composition according to claim 2 having from 0 to 0.2 part by weight of finely divided silica and wherein the α-cyanoacrylic acid ester has an acidic inhibitor content such that one gram of said ester admixed with 0.2 gram of sodium chloride and 50 milliliters of water results in an admixture having a pH from 2.45 to 4.1.

15. A composition according to claim 13 wherein the sole α-cyanoacrylic acid ester is n-butyl-α-cyanoacrylate.

16. A composition according to claim 13 wherein the sole α-cyanoacrylic acid ester is isobutyl-α-cyanoacrylate.

17. A composition according to claim 13 wherein the sole α-cyanoacrylic acid ester is amyl-α-cyanoacrylate.

18. A composition according to claim 13 wherein the sole α-cyanoacrylic acid ester is hexyl-α-cyanoacrylate.

19. A composition according to claim 14 wherein the sole α-cyanoacrylic acid ester is heptyl-α-cyanoacrylate.

20. A composition according to claim 14 wherein the sole α-cyanoacrylic acid ester is octyl-α-cyanoacrylate.

21. A composition according to claim 14 wherein the sole α-cyanoacrylic acid ester is 2-ethylhexyl-α-cyanoacrylate.

22. A process for preparing a composition according to claim 14 which comprises admixing the α-cyanoacrylic acid ester with the filler and any silica until a smooth paste is obtained.

23. A composition according to claim 1 containing a free-radical-inhibiting amount of monomethylether of hydroquinone.

24. A composition according to claim 1 consisting essentially of ingredients (a) and (b).

* * * * *

UNITED STATES PATENT OFFICE

CERTIFICATE OF CORRECTION

Patent No. 3,896,077      Dated July 22nd, 1975

Inventor(s) LEONARD ET AL

It is certified that error appears in the above-identified patent and that said Letters Patent are hereby corrected as shown below:

Column 1, line 50, "0.001" should read --0.001%--; line 57, "0.001" should read --0.001%--.

Column 4, lines 11 and 12, "$H_2C=C(CN)$" with $\beta$ over the first C and $\alpha$ over the second C should read --$H_2C=C(CN)$-- with $\beta$ and $\alpha$ correspondingly. Column 6, line 15, "+is" should read --" is--. Column 10, line 35, "$^{32}$" should read --$\underset{\diagdown\diagup}{32}$--; line 38, "is $^{32}$" should read --is $\underset{\diagdown\diagup}{32}$--; line 40, "$^{125}$" should read --$\underset{\diagdown\diagup}{125}$--. Column 11, line 47, "substances" shculd read --substrates--; line 65, "$^{32}$" should read --$\underset{\diagdown\diagup}{32}$--. Column 13, lines 31 and 32, "DISCUSSION" should read --

II. The polymethylmethacrylate solution was thick and viscous. No adhesion was obtained even after holding the surfaces together for ten minutes.

DISCUSSION-- .

Column 15, line 13, "atoms" should read --carbon atoms--.

Signed and Sealed this twenty-seventh Day of April 1976

[SEAL]

Attest:

RUTH C. MASON
*Attesting Officer*

C. MARSHALL DANN
*Commissioner of Patents and Trademarks*